United States Patent [19]

Walrath et al.

[11] 4,150,190

[45] Apr. 17, 1979

[54] METHOD OF COATING CONDUCTORS WITH SOLUTIONS OF POLYVINYL ACETALS

[75] Inventors: George A. Walrath, Scotia; John T. Keating, Clifton Park, both of N.Y.

[73] Assignee: Schenectady Chemicals, Inc., Schenectady, N.Y.

[21] Appl. No.: 845,715

[22] Filed: Oct. 26, 1977

Related U.S. Application Data

[62] Division of Ser. No. 779,550, Mar. 21, 1977.

[51] Int. Cl.$^2$ .................. B05D 5/12; C08F 16/06; C08F 16/34; C08K 5/05
[52] U.S. Cl. ................. 428/379; 174/121 SR; 174/110 V; 260/33.2 R; 260/841; 260/844; 260/857 F; 260/859 R; 427/117; 427/120; 428/460; 526/7
[58] Field of Search ............... 428/460, 379; 260/33.2 R, 31.2, 32.8, 67 FP, 67 UA; 526/7; 427/117, 120

[56] References Cited

U.S. PATENT DOCUMENTS

| | | | |
|---|---|---|---|
| 2,138,889 | 12/1938 | Smith et al. | 260/33.2 R |
| 2,227,983 | 1/1941 | Smith | 260/33.2R |
| 2,307,588 | 1/1943 | Jackson et al. | 428/460 |
| 2,442,018 | 5/1948 | Quarles | 260/33.2 R |
| 3,101,991 | 8/1963 | Fukushima et al. | 526/7 |
| 3,346,530 | 10/1967 | Martains | 260/33.2 R |
| 3,998,792 | 12/1976 | Herman et al. | 526/7 |

OTHER PUBLICATIONS

Monsanto Polymers and Petrochemicals Co. Tech. Bulletin No. 6070B, "Butrar Polyvinyl Butyral, Formvar Polyvinyl Formva, Properties and Uses".

*Primary Examiner*—Michael F. Esposito
*Assistant Examiner*—Richard Bueker
*Attorney, Agent, or Firm*—Cushman, Darby & Cushman

[57] ABSTRACT

A method of coating conductors with polyvinyl formal dissolved in a solvent comprising certain monoalkyl ethers of diethylene glycol and triethylene glycol or the monophenyl ether of ethylene glycol, diethylene glycol, triethylene glycol, tetraethylene glycol or propylene glycol. In some cases it is necessary to have a diluent such as an aromatic hydrocarbon present.

59 Claims, No Drawings

METHOD OF COATING CONDUCTORS WITH SOLUTIONS OF POLYVINYL ACETALS

This is a division of application Ser. No. 779,550 filed Mar. 21, 1977.

The present invention is directed to certain novel solutions of polyvinyl formal.

Polyvinyl formal (Formvar) is normally employed with phenolic solvents as wire enamels for coating magnet wires.

These wire enamels have a number of disadvantages. Thus polyvinyl formals must be wet by a hydrocarbon diluent prior to adding the primary solvent. It is possible however, but not practical, to obtain a high concentration of solids, e.g., 16 to 22% solids is the rule in conventional cresylic acid since the viscosity becomes too high above this range, for conventional application. The solvent systems are expensive and the phenolic solvents are toxic and are pollutants.

It has now been found that novel solvents comprising certain monoalkyl ethers of diethylene glycol and triethylene glycol or the monophenyl ether of ethylene glycol, diethylene glycol, triethylene glycol, tetraethylene glycol or propylene glycol can be used as solvents for polyvinyl formals. In some cases it is necessary to have a diluent, e.g. an aromatic hydrocarbon present as will be discussed hereinafter.

Technical Bulletin No. 6070B of Monsanto Polymers and Petrochemicals Co. entitled "Butvar Polyvinyl Butyral, Formvar Polyvinyl Formal, Properties and Uses" shows the solubility properties of Formvar resins. The entire disclosure of the Technical Bulletin No. 6070B is hereby incorporated by reference and relied upon.

Bulletin No. 6070B shows that polyvinyl formal with either 68% or 82% formal content is insoluble in Cellosolve (monoethylether of ethylene glycol) while polyvinyl formal with 68% formal content is soluble in Methyl Cellosolve (monomethyl ether of ethylene glycol) but that polyvinyl formal with 82% formal content is not soluble in Methyl Cellosolve. It is not stated what is the concentration at which the solubility was tested but apparently it was quite low since the solubility of various polyvinyl butyrals was tested at either 5% solids or 10% solids depending on the particular polyvinyl butyral.

The Technical Bulletin No. 6070B also mentions that polyvinyl formals are soluble in mixtures of alcohols and aromatic hydrocarbons and the viscosity of a 15% solution of various polyvinyl formals in 60:40 toluene-ethanol at 25° C. is recorded. It is further disclosed that solutions of polyvinyl formals show marked increases in viscosity as resin solids increase. In the case of polyvinyl butyral it is disclosed that the solvent can be a mixture of diacetone alcohol, butyl alcohol, 95% ethyl alcohol and either xylene or toluene and that an unspecified part of the diacetone alcohol can be replaced by Cellosolve for lower viscosity. There is not mentioned any combination of a glycol monoether with another solvent for dissolving polyvinyl formals, which are more difficult to dissolve than polyvinyl butyrals.

The specific ether solvents with which the present invention is concerned are the monomethyl ether of diethylene glycol (Methyl Carbitol), the monoethyl ether of diethylene glycol (Carbitol), the monomethyl ether of triethylene glycol, the monoethyl ether of triethylene glycol, the monophenyl ether of ethylene glycol, the monophenyl ether of diethylene glycol, the monophenyl ether of triethylene glycol, the monophenyl ether of tetraethylene glycol, and the monophenyl ether of propylene glycol. The polyvinyl formals are only soluble in the monophenyl ether of ethylene glycol alone, the monophenyl ether of diethylene glycol alone, the monophenyl ether of triethylene glycol, the monophenyl ether of tetraethylene glycol, or the monophenyl ether of propylene glycol (or in a mixture of these monophenyl ethers).

The suitable monoalkyl ethers can be expressed by the formula

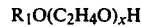

$$R_1O(C_2H_4O)_xH \qquad \text{I}$$

where $R_1$ is alkyl of 1 to 2 carbon atoms and x is 2 or 3.

The suitable phenyl ethers can be expressed by the formula

$$R_2O(C_nH_{2n}O)_yH \qquad \text{II}$$

where $R_2$ is phenyl, and y is 1, 2, 3, or 4 and n is 2 or 3.

The compounds of formula I must be used with a diluent while the compounds of formula II can be used alone or with a diluent.

The amount of diluent will vary depending on the diluent and the solids concentration desired. In general with the compounds of formula I there is used 10 to 95% of the compound and 90 to 5% of the diluent. (The same amount of diluent can be used, if desired, with the compounds of formula II and in addition to the diluents mentioned below there can also be used the compounds of formula I as diluents for the compounds of formula II, the compounds of formula I being less expensive than those of formula II.)

The proportions of the compound of formula I (or formula II) and diluent should be such as to provide a solution of polyvinyl formal having at least 20% solids and more preferably 25 to 35% solids, most preferably at least 30% solids.

Some of the formulations have the desired concentrations, both in the cold, e.g., at 77° F. (25° C.) or hot, e.g., at 140° F. (60° C.) or above while other formulations can only be used hot. The preferred formulations are those which impart the desired solubility of at least 20% solids, more preferably at least 25% solids in the cold since they have the broadest range of application.

For hot melt and extrusion work the temperature can be raised, e.g., to 120°–140° C. and the solids can be as high as 70% or even higher. The limiting factor in solids content is the viscosity which can be tolerated by the equipment.

As diluents there are especially preferred aromatic hydrocarbons such as benzene, toluene, xylene, ethyl benzene and other alkylated benzenes, alkylated naphthalenes. There can be present a minor amount of aliphatic hydrocarbons in the aromatic hydrocarbon. In the event that the hydrocarbon mixture does not sufficiently dissolve in the compound of formula I or II in the cold there can be added enough xylene or toluene (or even cyclohexanone) to render it more soluble. Examples of mixtures of hydrocarbons are enamel wire naphtha, Solvesso 100 (an aromatic naphtha, primarily monoalkyl benzenes, boiling in the range of 315°–350° F.), Solvesso 150 (a heavy aromatic naphtha which is primarily a mixture of tetramethyl benzene with dialkyl and trialkyl benzenes boiling in the range 360°–400° F.), a blend of 70% Solvesso 150 with 30% heavy aromatic naphtha (the blend being known as Solvesso N-150 and having a boiling range of 372°-500° F.), W.E.S. oil (a blend of aromatic hydrocarbons which distills 10% to not below 165° C., 70% to not above 190° C. and 95% to not above 235° C.). W.E.S. oil is an example of an enamel wire naphtha. Solvesso 100 can be used with the ethers of formula I in the hot but in the cold it is necessary to add xylene (or toluene) to get the desired solubility. Solvesso 150 can be blended with the ethers of formula I hot but not cold.

Other diluents include Cellosolve, Cellosolve acetate (ethoxyethyl acetate), lower alkyl acetates, e.g., methyl acetate, ethyl acetate, lower alkanols, such as those having 1 to 3 carbon atoms, e.g., methyl alcohol, ethyl alcohol, isopropyl alcohol, ketones including lower alkanones, e.g., acetone, methyl ethyl ketone and methyl isobutyl ketone, cyclohexanone, Butyl Carbitol (butyl ether of diethylene glycol), Hexyl Carbitol (hexyl ether of diethylene glycol). The alkanols were only useful with the compounds of formula II as diluents in polyvinyl formal enamels.

Propasol DM solvent (monomethyl ether of dipropylene glycol) can also be used as a diluent together with the aromatic solvent to give a composition in which the polyvinyl formal is soluble in the hot.

The wire enamels of the present invention can have the conventional additives employed in coating magnet wire and other electrical conductors. Thus there can be employed phenolic resins, e.g., phenol-formaldehyde resins, such as p-phenylphenol-formaldehyde, metapara cresol-formaldehyde, phenol-formaldehyde, alkylphenol-formaldehyde resins. There can also be added conventional blocked isocyanates, e.g., the reaction product of glycerine and toluene diisocyanate blocked with phenol, the reaction product of diethylene glycol and trimethylol propane with toluene diisocyanate blocked with phenol Mondur S (butylene glycol and trimethylol propane with toluene diisocyanate blocked with a phenol), trimethylol propane and 1,3-butylene glycol reacted with toluene diisocyanate blocked with phenol. Other conventional additives such as polyesters or resimenes may be added.

Examples of suitable polyvinyl formals (all are free flowing powders) are those set forth below. The properties are taken from Technical Bulletin No. 6070B.

difficult to dissolve in solvents and which are the most important polyvinyl formals for use as wire coating.

Unless otherwise indicated all parts and percentages are by weight.

The compositions of the invention can comprise, consist essentially of or consist of the materials set forth.

The wire enamels can be applied to copper, silver, aluminum or other wires using conventional coating procedures and wire speeds and temperatures, e.g., 400° to 800° F. In the working examples the temperature of application to the wire was 140° F. and the wire speed was 45 ft/min.

In place of the Carbitol materials there of course can be used the same solvents sold under other trademarks such as Dowanol.

There is no problem in determining whether any particular combination of solvent and diluent is suitable. All that is necessary is to mix the solvent and diluent and add polyvinyl formal at the desired concentration and heat to 60° C. to see if solution occurs. To determine whether the polyvinyl formal is soluble at 25° C. the solution is then cooled to 25° C. (If the polyvinyl formal is not soluble in the hot mixture there is no need to test its solubility in the cold as it will not be soluble.

The novel solvent systems of the invention have the following advantages over the present day commercial phenolic solvent containing wire enamels:

1. The polyvinyl formal powder does not need to be wet by a hydrocarbon diluent prior to the addition of the primary solvent.

2. The final coatings are at much higher percentage solids, e.g., 25-35%, and when heated to application temperature have lower viscosities than those of equal solids in conventional solvent systems.

3. The current conventional solvent systems are more expensive.

4. The new glycol ether (formula I or formula II) based solvent systems are less toxic than the conventional phenol, cresol and xylenol based solvent systems. Thus, the end result is that the polyvinyl formal solutions in glycol ether based solvent systems of the invention are more readily processed, handled and ecologically advantageous.

As previously pointed out, except for the phenyl glycol ethers of formula II, the polyvinyl formal pow-

| Property | Units | Type of Formvar | | | | |
|---|---|---|---|---|---|---|
| | | 12/85 | 5/95 | 6/95 | 7/95 | 15/95E |
| Volatiles, max. | % | 1.5 | 1.5 | 1.0 | 1.0 | 1.0 |
| Molecular wt. (weight average) | | 26,000–34,000 | 10,000–15,000 | 14,000–17,000 | 16,000–20,000 | 24,000–40,000 |
| Solution Viscosity 15% by wt. in 60:40 toluene-ethanol at 25° C. | cp | 500–600 | 100–200 | 200–300 | 300–500 | 3000–4500 |
| Hydroxyl content expressed as % polyvinyl alcohol | | 5.5–7.0 | 5.0–6.5 | 5.0–6.5 | 5.0–6.5 | 5.0–6.0 |
| Acetate content expressed as % polyvinyl acetate | | 22–30 | 9.5–13.0 | 9.5–13.0 | 9.5–13.0 | 9.5–13.0 |
| Formal content expressed as % polyvinyl formal approx. | | 68 | 82 | 82 | 82 | 82 |

The solvent systems of the invention are particularly useful with the polyvinyl formals of relatively high formal content, e.g., 82%, which are normally most ders used are not soluble in the component parts of the systems described. However, when the component parts are blended, the polyvinyl formal is readily dissolved and forms a stable, clear solution at room temperature (or in some cases only at elevated temperature).

EXAMPLE I

| Reactant | Batch Weight, Grams |
| --- | --- |
| 1. Solvesso 100 | 162 |
| 2. Xylol | 162 |
| 3. 7/95E Formvar Powder | 260 |
| 4. Methyl Carbitol | 158 |
| 5. Ethyl Carbitol | 214 |
| 6. Phenolic Resin I in Methyl Carbitol* | 270 |
| 7. Blocked Isocyanate I** | 28.6 |
| 8. Xylol | 18 |
| 9. Solvesso 100 | 18 |
| 10. Methyl Carbitol | 24 |
| 11. Ethyl Carbitol | 24 |

*Phenolic Resin I is the reaction product of meta para cresol and formaldehyde and is at 41.5 percent solids in methyl carbitol.
**Blocked isocyanate I is made from diethylene glycol and trimethylol propane with toluene diisocyanate and blocked with phenol.

Parts one through five were charged into a three liter reaction kettle equipped with an agitator, thermometer and condenser. The batch was heated to 70° C. and held until three was all dissolved. Parts 6 through 11 were then added. The reaction temperature dropped during the addition to 60° C. The reaction mixture was held for one hour at this temperature then filtered through a paper cone. The viscosity of this mixture at 140° C. was 3375 cps. The percent solids as determined at two grams for two hours at 400° F. was 31.2 percent.

A 3.2 mil coating of this material was applied to 18AWG copper wire. The coated wire had a good appearance. The properties are as shown in Table I.

A similar wire enamel solution was held for two weeks at 130° F. The only changes observed were a darkening of the reaction mixture's color and very slight advance in viscosity from 3375 centipoises to 3500 centipoises.

A viscosity study conducted in an open pot at 140° F. on the product of Example I showed an increase in viscosity of 4000 centipoises over a seven hour time span. The initial increase from 3750 centipoises to 7375 centipoises took only one and one half hours. The solution viscosity remained relatively stable thereafter, advancing only 275 centipoises in the next five and one half hours. In contrast similar conventional systems with phenolic solvents have also shown an inital doubling of viscosity, however upon prolonged holding at elevated temperatures the viscosity continued to advance exponentially.

EXAMPLE II

| Reactant | Batch Weight, Grams |
| --- | --- |
| 1. Solvesso 100 | 139 |
| 2. Xylol | 139 |
| 3. 7/95E Formvar Powder | 130 |
| 4. Methyl Carbitol | 262 |
| 5. Phenolic Resin I 40% Solution in Cresylic Acid | 145 |
| 6. Blocked Isocyanate II* | 33.6 |
| 7. Solvesso 100 | 6 |
| 8. Xylol | 6 |
| 9. Methyl Carbitol | 17 |

*Blocked isocyanate II is the reaction product of glycerine and toluene diisocyanate blocked with phenol and is dissolved at 40 percent solids in cresylic acid.

The blending procedure was carried out as stated in Example I with parts 1 through 4 being charged then heated slightly to aid in dissolving 3. When 3 was dissolved in the solvents, the rest of the materials were added and blended into the solution thoroughly prior to filtration.

The percent solids determined by baking three grams for one half hour at 400° F. were 21.6 percent.

The viscosity determined on the Gardner-Holdt scale at 77° F. was Z2 ¾.

The solution was applied to 18 AWG copper wire and tested as a magnet wire coating. A 2.9 mil build was obtained at 45 feet per minute with good appearance. The electrical test properties are as shown in Table I.

EXAMPLE III

| Reactant | Batch Weight, Grams |
| --- | --- |
| 1. Solvesso 100 | 162 |
| 2. Xylol | 162 |
| 3. 7/95E Formvar Powder | 260 |
| 4. Methyl Carbitol | 158 |
| 5. Ethyl Carbitol | 214 |
| 6. Phenolic Resin I in Methyl Carbitol (40–42% solids) | 270 |
| 7. Xylol | 18 |
| 8. Solvesso 100 | 18 |
| 9. Methyl Carbitol | 24 |
| 10. Ethyl Carbitol | 24 |

This coating was blended as described in Example I.

The viscosity at 140° F. was determined to be 3700 centipoises.

The solids were 28.4 percent.

When used to coat 18 AWG copper wire this enamel gave a 2.8 mil build at 45 fee per minute. The appearance was rated as good. Other test results are shown in Table I.

EXAMPLE IV

| Reactant | Batch Weight, Grams |
| --- | --- |
| 1. Solvesso 100 | 13.9 |
| 2. Xylol | 13.9 |
| 3. 7/95E Formvar | 13.0 |
| 4. Methyl Carbitol | 29.2 |
| 5. Phenolic Resin I in Methyl Carbitol (40–42%) | 13.5 |
| 6. Blocked Isocyanate I | 1.5 |
| 7. Xylol | 0.6 |
| 8. Solvesso 100 | 0.6 |
| 9. Methyl Carbitol | 1.7 |

The batch was blended as in Example One.

The viscosity was 2500 cps at 130° F.

The solids were calculated to be 21.2 percent.

This batch when cooled had a very slight haze which did not worsen after standing at room temperature for 24 hours. This haze disappeared upon very slight heating.

EXAMPLE V

| Reactant | Batch Weight, Grams |
| --- | --- |
| 1. Solvesso 100 | 13.9 |
| 2. Xylol | 13.9 |
| 3. 7/95E Formvar Powder | 13.0 |
| 4. Ethyl Carbitol | 29.2 |
| 5. Phenolic Resin I in Methyl Carbitol (40–42% Solids) | 13.5 |
| 6. Blocked Isocyanate I | 1.5 |
| 7. Xylol | 0.6 |
| 8. Solvesso 100 | 0.6 |

-continued

| Reactant | Batch Weight, Grams |
|---|---|
| 9. Ethyl Carbitol | 1.7 |

The batch was blended as in Example I.
The percent solids was 21.2 percent.
The batch was soluble hot, and remained in solution upon cooling for a short period. However, upon leaving the batch sit in a covered container over night, it became cloudy.

EXAMPLE VI

Butyl Carbitol was tried in a blend as in Examples IV and V (i.e., it replaced the Methyl Carbitol or Ethyl Carbitol) and was insoluble hot and at room temperature.

EXAMPLE VII

Examples IV and V were blended together in equal portions to produce a clear stable solution, with a viscosity of 2475 centipoises at 130° F. and 21.2 percent solids.

EXAMPLE VIII

To Example VII enough of Example VI was added to produce a solvent system containing 40 percent Methyl Carbitol, 40 percent Ethyl Carbitol and 20 percent Butyl Carbitol based on the total Carbitols. The solution remained clear at room temperature.

When enough of Example VI was added to Example VII to give equal portions of methyl, ethyl and butyl Carbitols in the solvent system, the mixture became insoluble.

| Ingredient | Batch Weight, Gram |
|---|---|
| 6/95E Formvar Powder | 10 |
| Methyl Carbitol | 12 |
| Ethyl Carbitol | 12 |
| Diluent | 16 |

Only the diluents are listed in Table II.

A series of diluents were tried in determining the scope of the invention. In Table II are representative examples of several classes of compounds and their effects on the polyvinyl formal solvent system.

All solutions were compounded at 20 percent calculated solids using 6/95E Formvar Powder at 15 centipoises. The solvent system contained 30 percent Methyl Carbitol, 30 percent Ethyl Carbitol and 40 percent of the diluent of choice. The standard formula used therefore read:

| Ingredient | Batch Weight, Grams |
|---|---|
| 6/95E Formvar Powder | 10 |
| Methyl Carbitol | 12 |
| Ethyl Carbitol | 12 |
| Diluent | 16 |

Only the diluents are listed in Table II.

Table II

| Diluent | Soluble Hot (140° F.) | Soluble Cold (77° F.) | Viscosity at 130° F. |
|---|---|---|---|
| Solvesso 150 | Yes | No | Not Determined |
| Heavy Aromatic Naphtha | Yes | No | Not Determined |
| Solvesso N-150 | Yes | No | Not Determined |
| Solvesso 100 | Yes | Slightly | Not Determined |
| W.E.S. Oil | Yes | Yes | 2625 centipoises |
| Xylol | Yes | Yes | 2075 centipoises |
| Toluene | Yes | Yes | Not Determined |
| Cellosolve | Yes | No | Not Determined |
| Cellosolve Acetate | Yes | No | Not Determined |
| Ethyl Acetate | Yes | No | Not Determined |
| Ethyl Alcohol | No | No | Not Determined |
| Methyl Alcohol | No | No | Not Determined |
| Isopropyl Alcohol | No | No | Not Determined |
| Acetone | Yes | Yes* | Not Determined |
| Cyclohexanone | Yes | Yes | 2502.5 centipoises |
| Methyl Ethyl Ketone | Yes | No | Not Determined |
| Methyl Isobutyl Ketone | Yes | No | Not Determined |

*Upon standing a white layer formed on the top of the container where the acetone evaporated off.

Table III lists other various solvent systems tried and the results obtained. All the reactions were compounded at 20 percent calculated solids.

Table III

| Formula | Batch Weight in Grams | Percent of Solvent System | Soluble Hot (140° F.) | Soluble Cold (77° F.) | Viscosity at 130° F. |
|---|---|---|---|---|---|
| 6/95E Formvar Powder | 10 | — | | | |
| Methyl Carbitol | 12 | 30 | | | |
| Ethyl Carbitol | 12 | 30 | Yes | Yes | 2550 centipoises |
| Solvesso 100 | 8 | 20 | | | |
| Xylol | 8 | 20 | | | |
| 6/95E Formvar Powder | 10 | — | | | |
| Methyl Carbitol | 12 | 30 | | | |
| Ethyl Carbitol | 12 | 30 | Yes | Yes | 2600 centipoises |
| Solvesso | 12 | 30 | | | |

Table III-continued

| Formula | Batch Weight in Grams | Percent of Solvent System | Soluble Hot (140° F.) | Soluble Cold (77° F.) | Viscosity at 130° F. |
|---|---|---|---|---|---|
| 100 Xylol | 4 | 10 | | | |
| 6/95E Formvar Powder | 10 | — | | | |
| Hexyl Carbitol | 24 | 60 | Yes | No | Not Determined |
| Solvesso 100 | 8 | 20 | | | |
| Xylol | 8 | 20 | | | |
| 6/95E Formvar Powder | 10 | — | | | |
| Hexyl Carbitol | 12 | 30 | | | |
| Methyl Carbitol | 12 | 30 | Yes | No | Not Determined |
| Xylol | 8 | 20 | | | |
| Solvesso 100 | 8 | 20 | | | |
| 695E Formvar Powder | 10 | — | | | |
| Propasol DM Solvent | 24 | 60 | | | |
| Xylol | 8 | 20 | No | No | Not Determined |
| Solvesso 100 | 8 | 20 | | | |
| 6/95E Formvar Powder | 10 | — | | | |
| Propasol DM Solvent | 12 | 30 | | | |
| Methyl Carbitol | 12 | 30 | Yes | No | Not Determined |
| Xylol | 8 | 20 | | | |
| Solvesso 100 | 8 | 20 | | | |
| 6/95E Formvar Powder | 10 | — | | | |
| Phenyl Glycol Ethers* | 24 | 60 | | | |
| Xylol | 8 | 20 | Yes | Yes | Not Determined |
| Solvesso 100 | 8 | 20 | | | |
| 6/95E Formvar Powder | 10 | — | | | |
| Phenyl Glycol Ethers* | 12 | 30 | | | |
| Methyl Carbitol | 12 | 30 | Yes | Yes | Not Determined |
| Xylol | 8 | 20 | | | |
| Solvesso 100 | 8 | 20 | | | |
| 6/95E Formvar Powder | 10 | — | | | |
| Ethoxy Triethylene Glycol | 24 | 60 | Yes | No | Not Determined |
| Xylol | 8 | 20 | | | |
| Solvesso 100 | 8 | 20 | | | |
| 6/95E Formvar Powder | 10 | — | | | |

Table III-continued

| Formula | Batch Weight in Grams | Percent of Solvent System | Soluble Hot (140° F.) | Soluble Cold (77° F.) | Viscosity at 130° F. |
|---|---|---|---|---|---|
| Ethoxy Triethylene Glycol | 12 | 30 | | | |
| Methyl Carbitol | 12 | 30 | Yes | Yes | Not Determined |
| Xylol | 8 | 20 | | | |
| Solvesso 100 | 8 | 20 | | | |
| 6/95E Formvar Powder | 10 | — | | | |
| Ethoxy Triethylene Glycol | 12 | 30 | | | |
| Methyl Carbitol | 12 | 30 | Yes | Yes | Not Determined |
| Xylol | 8 | 20 | | | |
| Solvesso 100 | 8 | 20 | | | |
| 6/95E Formvar Powder | 10 | — | | | |
| Methoxy Triethylene Glycol | 24 | 60 | Yes | Yes | Not Determined |
| Xylol | 8 | 20 | | | |
| Solvesso 100 | 8 | 20 | | | |
| 6/95E Formvar Powder | 10 | — | | | |
| Methoxy Triethylene Glycol | 12 | 30 | | | |
| Methyl Carbitol | 12 | 30 | Yes | Yes | Not Determined |
| Xylol | 8 | 20 | | | |
| Solvesso 100 | 8 | 20 | | | |
| 6/95E Formvar Powder | 10 | — | | | |
| Phenyl Glycol Ethers* | 40 | 100 | Yes | Yes | Not Determined |
| 6/95E Formvar Powder | 10 | — | | | |
| Phenyl Glycol Ethers* | 30 | 50 | Yes | Yes | Not Determined |
| Ethyl Alcohol | 30 | 50 | Yes | Yes | Not Determined |
| 6/95E Formvar Powder | 10 | — | | Yes | Yes | Not Determined |
| Dowanol PPH*** T4Ph** | 40 | 100 | | | |
| 6/95E Formvar Powder | 10 | — | | Yes | Yes | Not Determined |
| Dowanol PPH*** | 40 | 100 | | | |
| 6/95E Formvar Powder | 10 | — | | Yes | Yes | Not Determined |
| Dowanol T4Ph** | 30 | 50 | | | |
| Ethyl | 30 | 50 | | | |

Table III-continued

| Formula | Batch Weight in Grams | Percent of Solvent System | Soluble Hot (140° F.) | Soluble Cold (77° F.) | Viscosity at 130° F. |
|---|---|---|---|---|---|
| Alcohol | | | | | |
| 6/95E Formvar Powder | 10 | — | Yes | Yes | Not Determined |
| Dowaol PPh*** | 30 | 50 | | | |
| Ethyl Dowanol Alcohol | 30 | | | | |

*Phenyl Glycol Ethers — A blend of 70 percent ethylene glycol monophenyl ether and 30 percent diethylene glycol monophenyl ether.

From Table III it is clear that Methoxy Triethylene Glycol compares to Methyl Carbitol as does Ethoxy Triethylene Glycol to Ethyl Carbitol.

Also from Table III it is obvious that the Phenyl Glycol Ethers are good solvents for Formvar. Not only was the 6/95E Formvar Powder soluble in straight phenyl glycol ethers, but an equal amount of Ethyl Alcohol was added without precipitating out the Formvar solution. With Methyl Carbitol a diluent is needed and the Formvar powder is precipitated by even a slight addition of Ethyl Alcohol. Similar results were obtained when the phenyl ether of tetraethylene glycol and the phenyl ether of propylene glycol were used, as shown in Table III.

What is claimed is:

1. A method of applying an insulation coating of polyvinyl formal to an electrical conductor comprising applying a solution containing at least 20% polyvinyl formal in a solvent comprising (1) a glycol ether of the formula $$R_1O(C_2H_4O)_xH \qquad (I)$$

where $R_1$ is alkyl of 1 to 2 carbon atoms and x is 2 or 3, or $$R_2O(C_nH_{2n}O)_yH \qquad (II)$$

where $R_2$ is phenyl, y is 1, 2, 3 or 4, and n is 2 or 3, with (2) a diluent in an amount of 5 to 90% when (1) has formula (I) and 0 to 90% when (1) has formula (II), the diluent being (a) selected from the group consisting of aromatic hydrocarbons, lower alkoxyethanol, lower alkoxyethyl acetate, lower alkyl acetate, lower alkanones, cyclohexanone, butoxyethoxyethanol and hexoxyethoxyethanol when (1) has formula (I) and the diluent being (a) or a lower alkanol or a compound of formula (I) when (1) has formula (II), the proportions of glycol ether and diluent being so regulated that a solution of the polyvinyl formal occurs.

2. A method according to claim 1 wherein the solution contains at least 30% polyvinyl formal.

3. A method according to claim 2 wherein the solution contains 30 to 70% polyvinyl formal.

4. A method according to claim 1 wherein the solution contains 25 to 35% polyvinyl formal.

5. A method according to claim 4 wherein the solution contains 30 to 35% polyvinyl formal.

6. A method according to claim 1 wherein the polyvinyl formal is soluble in the solvent at 25° C.

7. A method according to claim 6 wherein the solution contains at least 25% polyvinyl formal.

8. A method according to claim 7 wherein the solution contains 25 to 35% polyvinyl formal.

9. A method according to claim 8 wherein the solution contains 30 to 35% polyvinyl formal.

10. A method according to claim 1 wherein the polyvinyl formal is soluble in the solvent at 60° C.

11. A method according to claim 10 wherein the solution contains at least 30% polyvinyl formal.

12. A method according to claim 1 wherein the polyvinyl formal has a formal content of about 68 to 82%.

13. A method according to claim 12 wherein the polyvinyl formal has a formal content of about 82%.

14. A method according to claim 13 wherein the solvent consists of phenoxyethanol, phenoxyethoxyethanol or a mixture of phenoxyethanol and phenoxyethoxyethanol.

15. A method according to claim 13 wherein the solvent comprises a compound of formula (I) and as the diluent, an aromatic hydrocarbon, acetone or cyclohexanone.

16. A method according to claim 15 wherein x is 2.

17. A method according to claim 15 wherein the solvent comprises essentially of the compound of formula (I), a portion of a compound of formula (I) has methyl for $R_1$ and an aromatic hydrocarbon diluent and wherein the polyvinyl formal is soluble in the solvent at 25° C.

18. A method according to claim 17 wherein the solution contains 25 to 35% polyvinyl formal.

19. A method according to claim 17 wherein the solution contains at least 30% polyvinyl formal.

20. A method according to claim 19 wherein the aromatic hydrocarbon includes xylene or toluene in an amount sufficient to provide said solubility.

21. A method according to claim 17 wherein the aromatic hydrocarbon includes xylene or toluene in an amount sufficient to provide said solubility.

22. A method according to claim 17 wherein the compound of formula (I) is methoxyethoxyethanol.

23. A method according to claim 17 wherein the compound of formula (I) is a mixture of methoxyethoxyethanol and ethoxyethoxyethanol.

24. A method according to claim 17 wherein there is also present as an additional diluent butoxyethoxyethanol, hexoxyethoxyethoxyethanol or methoxypropoxypropanol, the additional diluent being present in an amount insufficient to render the polyvinyl formal insoluble at 60° C.

25. A method according to claim 17 wherein the diluent includes aromatic hydrocarbon boiling point at 315°-350° F.

26. A method according to claim 17 wherein there is also present in the diluent xylene or toluene as an additional aromatic hydrocarbon in an amount sufficient to render the polyvinyl formal soluble at 25° C.

27. A method according to claim 26 wherein there is present in the diluent xylene in an amount sufficient to render the polyvinyl formal soluble at 25° C.

28. A method according to claim 27 wherein the concentration of polyvinyl formal is 25 to 35% and the xylene is present in an amount sufficient to render the polyvinyl formal soluble at 25° C.

29. A method according to claim 27 wherein the concentration of polyvinyl formal is at least 30% and the xylene is present in an amount sufficient to render the polyvinyl formal soluble at 25° C.

30. A method according to claim 29 wherein the solvent consists of 60% of a compound of formula (I) and 40% of said aromatic hydrocarbon diluent.

31. A method according to claim 30 wherein the solvent consists of 60% of a compound of formula (I), 20% of said aromatic hydrocarbon diluent boiling at 315°–350° F. and 20% xylene.

32. A method according to claim 28 wherein the solvent consists of 60% of a compound of formula (I) and 40% of said aromatic hydrocarbon diluent.

33. A method according to claim 32 wherein the solvent consists of 60% of a compound of formula (I), 20% of said aromatic hydrocarbon diluent boiling at 315°–350° F. and 20% xylene.

34. A method according to claim 13 wherein the solvent includes a compound of formula (II) and as a diluent a compound of formula I, butoxyethoxyethanol, hexoxyethoxyethanol or an alkyl alcohol having 1 to 3 carbon atoms in the alkyl group, said diluent being present in an amount insufficient to render the polyvinyl formal insoluble at 60° C.

35. A method according to claim 34 wherein the diluent is a compound of formula (I).

36. A method according to claim 13 wherein the solution contains a phenol-formaldehyde resin.

37. A method according to claim 1 wherein the solvent consists of phenoxyethanol, phenoxyethoxyethanol or a mixture of phenoxyethanol and phenoxyethoxyethanol.

38. A method according to claim 1 wherein the solvent comprises a compound of formula (I) and as the diluent, an aromatic hydrocarbon, acetone or cyclohexanone.

39. A method according to claim 38 wherein x is 2.

40. A method according to claim 38 wherein the solvent consists essentially of the compound of formula (I), at a portion of a compound of formula (I) has methyl for $R_1$ and an aromatic hydrocarbon diluent and wherein the polyvinyl formal is soluble in the solvent at 25° C.

41. A method according to claim 40 wherein the solution contains 25 to 35% polyvinyl formal.

42. A method according to claim 40 wherein the solution contains at least 30% polyvinyl formal.

43. A method according to claim 42 wherein the aromatic hydrocarbon includes xylene or toluene in an amount sufficient to provide said solubility.

44. A method according to claim 40 wherein the aromatic hydrocarbon includes xylene or toluene in an amount sufficient to provide said solubility.

45. A method according to claim 40 wherein the compound of formula (I) is methoxyethoxyethanol.

46. A method according to claim 40 wherein the compound of formula (I) is a mixture of methoxyethoxyethanol and ethoxyethoxyethanol.

47. A method according to claim 40 wherein the diluent includes aromatic hydrocarbon boiling point at 315°–350° F.

48. A method according to claim 42 wherein there is also present in the diluent xylene or toluene as an additional aromatic hydrocarbon in an amount sufficient to render the polyvinyl formal soluble at 25° C.

49. A method according to claim 48 wherein there is present in the diluent xylene in an amount sufficient to render the polyvinyl formal soluble at 25° C.

50. A method according to claim 49 wherein the concentration of polyvinyl formal is 25 to 35% and the xylene is present in an amount sufficient to render the polyvinyl formal soluble at 25° C.

51. A method according to claim 50 wherein the concentration of polyvinyl formal is at least 30% and the xylene is present in an amount sufficient to render the polyvinyl formal soluble at 25° C.

52. A method according to claim 51 wherein the solvent consists of 60% of a compound of formula (I) and 40% of said aromatic hydrocarbon diluent.

53. A method according to claim 52 wherein the solvent consists of 60% of a compound of formula (I), 20% of said aromatic hydrocarbon diluent boiling at 315°–350° F. and 20% xylene.

54. A method according to claim 1 wherein the solvent includes a compound of formula (II) and as a diluent a compound of formula (I), butoxyethoxyethanol, hexoxyethoxyethanol or an alkyl alcohol having 1 to 3 carbon atoms in the alkyl group, said diluent being present in an amount insufficient to render the polyvinyl formal insoluble at 60° C.

55. A method according to claim 54 wherein the diluent is a compound of formula (I).

56. A method according to claim 1 wherein the solution contains a phenol-formaldehyde resin.

57. A method according to claim 13 wherein the solvent consists of the solvent of formula (II).

58. A method according to claim 57 wherein the solvent is phenoxyethoxyethoxyethoxyethanol or the monophenyl ether of propylene glycol.

59. A method according to claim 1 wherein the solvent consists of a solvent of formula (II).

* * * * *